(12) United States Patent
Willis et al.

(10) Patent No.: US 6,588,981 B2
(45) Date of Patent: Jul. 8, 2003

(54) PIPE HANDLING APPARATUS

(75) Inventors: Stewart K Willis, Aboyne (GB); Richard W Turnbull, Sowerby (GB)

(73) Assignee: Stolt Offshore Limited (GB)

( * ) Notice: Subject to any disclaimer, the term of this patent is extended or adjusted under 35 U.S.C. 154(b) by 0 days.

(21) Appl. No.: 09/875,445

(22) Filed: Jun. 5, 2001

(65) Prior Publication Data

US 2002/0021942 A1 Feb. 21, 2002

(30) Foreign Application Priority Data

Jun. 5, 2000 (GB) .............................................. 0013569
Feb. 16, 2001 (GB) .............................................. 0103861

(51) Int. Cl.[7] .............................. F16L 1/12; E21B 19/00
(52) U.S. Cl. ................. 405/168.1; 405/154.1; 405/166; 405/167; 405/168.3; 405/170; 414/22.51; 414/22.69; 414/745.4; 414/745.7
(58) Field of Search .................. 405/166, 168, 405/168.1–168.4, 169, 170, 171, 184.4, 184.5, 154.1, 155; 414/22.51, 22.55, 22.65, 22.69, 745.1, 745.4, 746.4, 746.7, 746.8, 559, 571, 575; 242/393, 397.3, 564, 566, 615.1; 175/52, 85; 166/77.51, 77.52, 85.1, 85.5

(56) References Cited

U.S. PATENT DOCUMENTS

| | | | |
|---|---|---|---|
| 3,644,695 A | | 2/1972 | Shuey, Jr. et al. ............ 219/8.5 |
| 3,680,322 A | * | 8/1972 | Nolan, Jr. et al. ........... 405/166 |
| 3,982,402 A | * | 9/1976 | Lang et al. ............... 405/168.3 |
| 4,345,855 A | * | 8/1982 | Uyeda et al. ................ 405/168 |
| 4,362,261 A | | 12/1982 | Cook, Jr. ......................... 228/2 |
| 4,453,872 A | * | 6/1984 | Frias et al. ................ 414/22.61 |
| 4,455,116 A | * | 6/1984 | Lindstedt et al. ......... 414/22.66 |
| 4,591,294 A | | 5/1986 | Foulkes ....................... 405/170 |
| 4,791,997 A | * | 12/1988 | Krasnov .................... 175/85 X |
| 4,834,604 A | * | 5/1989 | Brittain et al. ............ 414/22.55 |
| 5,456,501 A | | 10/1995 | Reaux ........................... 285/96 |
| 5,533,834 A | * | 7/1996 | Recalde .................... 405/168.3 |
| 5,797,702 A | | 8/1998 | Drost et al. .................. 405/166 |
| 5,823,712 A | * | 10/1998 | Kalkman et al. ....... 405/166 X |
| 5,975,802 A | * | 11/1999 | Willis .......................... 405/166 |
| 5,997,215 A | * | 12/1999 | Schwert ....................... 405/184 |
| 6,273,643 B1 | * | 8/2001 | Baugh ......................... 405/166 |
| 6,328,502 B1 | * | 12/2001 | Hickey et al. ............ 405/168.3 |

FOREIGN PATENT DOCUMENTS

| | | | |
|---|---|---|---|
| GB | 306291 | 2/1929 | |
| GB | 614816 | 12/1948 | |
| GB | 1 363 177 | 9/1972 | |
| GB | 2070724 | * 9/1981 | ................. 405/166 |
| GB | 2 138 338 A | 10/1984 | |
| GB | 2 187 818 A | 9/1987 | |
| GB | 2 296 956 | 7/1996 | |
| GB | 2 299 646 | 10/1996 | |
| GB | 2 336 191 | 10/1999 | |
| JP | 61092799 | 5/1986 | |
| WO | WO 97/32686 | 9/1997 | |
| WO | WO 98/48142 | 10/1998 | |
| WO | WO 99/35429 | 7/1999 | |
| WO | WO 99/50582 | 10/1999 | |

\* cited by examiner

Primary Examiner—Jong-Suk James Lee
(74) Attorney, Agent, or Firm—Sheridan Ross P.C.

(57) ABSTRACT

A pipe handling apparatus for laying elongate articles in deep waters includes a tiltable pipe handling structure housing a traveling clamp for holding and/or paying out under tension the elongate article and a fixed clamp. The traveling clamp is driven via an articulated rack located by a guide mechanism. The rack driven by a pinion drive mechanism and acts at a lower portion of the rack, such that the center of gravity of the apparatus is lowered, and loading in the structure is reduced.

16 Claims, 6 Drawing Sheets

PIPE HANDLING APPARATUS

CROSS REFERENCE TO RELATED APPLICATIONS

Foreign priority benefits a e claimed under 35 U.S.C. §119 to United Kingdom Patent Applications, Serial No. GB 00135 69.9 filed Jun. 5, 2000 and Serial No. GB 0103861.1 filed Feb. 16, 2001, the entire disclosures of said applications are incorporated herein by reference.

BACKGROUND OF THE INVENTION

The invention relates to pipe handling apparatus, and in particular to a clamp for holding and/or paying out under tension an elongate article, such as a steel or similar pipe line or cable in deep water, from the deck of a pipe laying vessel. The invention independently relates to a piston arrangement suitable for applying radial compressive forces on a pipe or other cyclidrincal member, for example in radial friction welding.

Various arrangements are known for pipe laying operations. For deep water applications, the "J-Lay" arrangement has been adopted, in which, a continuous steel pipe is launched into the water at a relatively steep angle, using a tiltable ramp or tower. Examples of such systems are known for example from U.S. Pat. No. 5,975,802 of the present applicant, and from WO-A-99/50582 and WO-A-99/35429. From these documents, it will be understood that a great weight of pipe has to be supported beneath the vessel to control the paying out of the pipeline. For this purpose, the known documents propose either track-type tensioners or travelling clamps to grip and control movement of the pipe. A number of methods are currently used to apply pressure to the friction surfaces of these clamps. To date these have been by direct pressure applied by screw jacks or hydraulic rams, levers, pressurised bladders, or cams. These solutions tend to be bulky and do not lend themselves to use on a J-lay ramp where the clamp must pass between work stations at each payout of the pipeline.

It is presently desired to work at ever-increasing sea depths, and each new project therefore demands greater and greater tensions to be handled by the apparatus on the ramp. In meeting this requirement, the ramp itself must become stronger and therefore heavier, and also the tensioner and/or clamp and lifting apparatus become heavier at the same time. Aside from weight and expense of the vessel becoming undesirably increased, this weight is located high above the waterline, and therefore creates stability problems in the design of the vessel as a whole.

WO-A-98/48142 discloses a rack-and-pinion lifting arrangement as part of a drilling rig derrick. In this arrangement the weight of equipment to be lifted is taken by an articulated rack made of a large number of segments, running in a vertical main guide rail. The rack is incompressible longitudinally, and is driven from below by motors, such that the centre of gravity of the arrangement is not unduly raised. Moreover, the guide rails and tower themselves do not take the vertical load, and the derrick can therefore be of lighter construction itself.

Our co-pending application filed the same day and claiming priority from UK applications GB 00135698.1 (63591GB) and GB 0103861.1 (63591GB2) proposes using a preferred novel form of clamp for pipelay operations. While the present invention, relating to support and drive arrangement for a travelling clamp will be illustrated using such clamps, the invention is not limited to any specific form of clamp.

The invention aims to provide an improved clamp for use in pipelay and other applications.

BRIEF SUMMARY OF THE INVENTION

In accordance with a first aspect of the invention there is provided pipe handling apparatus having an articulated rack, a travelling clamp and guide means for guiding the travelling clamp and rack within an elongate structure, wherein drive means for elevating and lowering said clamp under load are arranged to act at a lower portion of said rack, the travelling clamp being connected to be driven along said guide means by movement of said rack in the guide means.

In one example the pipe handling apparatus comprises an elongate structure which is tiltable about a pivot point.

The pipe handling apparatus may be adapted for use on a vessel for laying pipes wherein said pivot point is substantially at deck level of said vessel, and the remainder of the structure is tiltable about said pivot point above deck level. Further, the drive means may be located within said structure below said pivot point.

In one arrangement of the invention a number of racks may be applied for balanced driving of the travelling clamp. Further each of the travelling clamps may be driven by an independent rack or racks.

In this invention the articulated rack below the drive means may act as a secondary guide means to the main guide means.

The travelling clamp may be driven by one or more helically threaded gears extending the length of said elongate support structure.

In one example of the invention, a piston driving arrangement for use in pipe handling apparatus is provided, the piston driving arrangement including a piston member constrained to move along a first axis towards and away from a fixed support, wherein an hydraulically operated wedge member is driven transverse to the first axis so as to act between the piston member and said fixed support to effect said motion.

The wedge member may be keyed to said piston member so as to effect forcible movement of the piston in opposite directions along said first axis. In one example the keying comprises a dovetail channel and rail arrangement.

Further, the wedge member may be keyed to the fixed support, or otherwise constrained against movement of said support.

The wedge member of the piston driving arrangement may be connected to hydraulic means.

In one example a plurality of wedges are grouped by mechanical linkage to a common hydraulic actuator. The plurality of wedges in this example may be each driven individually.

Alternatively, the plurality of wedges may be grouped by hydraulic linkage to equalise actuating forces around the circumference of an object under pressure.

The piston arrangement may be part of a radial compression arrangement in which a plurality of such pistons have their first axes aligned radially. The piston driving arrangement of this type of configuration may be arranged so that it provides radial pressure in radial friction welding apparatus.

The piston driving arrangement may be part of a pipe clamp for use in pipe laying apparatus, for example, with the piston being the closing drive means of a pipe clamp for use in pipe laying apparatus.

Further, the invention provides a clamp, for example, one adapted for use in pipe handling apparatus, the clamp including a plurality of ram arrangements mounted on a support and directed radially toward the centre of a workpiece object to be gripped, each ram arrangement comprising a push rod constrained to move in a radial direction and a wedge member driven in a direction across the radial direction and having an inclined surface so as to act between the push rod and said support to effect motion in said radial direction.

The wedge member in one embodiment is driven by hydraulic power. In a compact embodiment, the inclined surface is formed within the body of a hydraulic piston. Actuating surfaces may be provided at each end of said piston, the whole being mounted in a hydraulic cylinder, the push rod projecting through a side wall of said cylinder.

The inclined surface may be keyed to said push rod, so that the push rod can be pull as well as pushed along said first axis by the movement of the wedge member. The force therefore applied to the workpiece, such as the pipe, is a positively transmitted force and the ram is also positively withdrawn from contact with the elongate member when desired.

The keying of the push rod and the wedge may be by means of complementary angled keyways. The wedge member may similarly be keyed to the fixed support, or otherwise constrained against movement of said support.

A further clamp may be provided and controlled to operate in a set pattern. For example two co-operating clamps may be provided and operated so that the clamp may travel along the length of the elongate article and grip it in a "hand-to-hand" fashion.

The clamp may be openable to permit fitting around the article to be clamped.

The clamp may form a pipe clamp in a pipe laying apparatus, for example.

The clamp may alternatively be arranged to provide radial pressure in a radial friction welding apparatus of the type known from WO-A-97/32686, the contents of which are incorporated herein by reference.

The wedge member may be driven by hydraulic or pneumatic drive means. A plurality of wedge members may be grouped by mechanical linkage to a common hydraulic actuator, or each may be driven individually. A plurality of wedges or groups thereof may be grouped by hydraulic linkage, to equalise actuating forces around the circumference of an object under pressure and being gripped.

The inclined surface of the wedge member may have an angle and surface configuration such that the driving force of the ram arrangement will be maintained in the event of power loss.

The push rod may have mounted at one end thereof a shoe which engages the surface of the workpiece to exert pressure thereon. The shoe may be shaped so that the surface engaging the elongate article engages the maximum surface area and the pressure is thereby more evenly distributed and points of excessive pressure are not formed. In one arrangement the shoe has an engaging surface which is part-cylindrical to mimic the outer surface of the elongate article.

The shoe may include a friction tile which is changeable. The configuration of the tile can be changed to suit the elongate article being laid (for example, its radius of curvature), and of course in the event of wear or damage.

The shoe may be connected to the push rod by means of a pivot joint such as a universal joint. This enables the shoe to pivot in one or two dimensions with respect to the axis of the push rod and thereby accommodate small irregularities of in the angle at which it engages the workpiece.

The shoes may be keyed directly to said support independently of the push rod so as to constrain movement under axial loading of the workpiece. This avoids the transfer of heavy loads to the ram arrangement and wedge member, for example, when clamping a heavy pipe during laying.

Further the invention provides a pipe handling apparatus wherein a travelling clamp is guided within an elongate structure, wherein said travelling clamp includes a ram constrained to move along a first axis towards and away from a fixed support, wherein a wedge is driven transverse to the first axis so as to act between the piston member and said fixed support to effect said motion. The further optional features of the invention in its first aspect may be applied, as set forth above.

Said elongate structure may be tiltable generally about a pivot point. Said pivot point substantially at deck level of a pipe laying vessel, the remainder of the structure being tiltable above deck level.

Drive means may be located within said elongate structure below said pivot point.

A rack may be provided for elevating and lowering said clamp under load with the arrangement being such that the load on the clamp when elevated acts in the rack, rather than directly on the elongate structure.

By these features, particularly in combination, the advantages of low weight and low centre of gravity can be brought to bear, while the clamp for pipe laying operations can itself be elevated for example 15 meters up and down the ramp or tower structure. Various ramp and tower arrangements known from the documents cited above and other sources can be adapted advantageously in this way.

When the drive means are carried in the structure below said pivot point, there is the advantage that the tension in the pipeline is transferred via the rack to the structure where it appears substantially as tension in the steel-work, rather than the compressive loads which are present in conventional travelling clamp structures.

Plural racks may be applied for balanced driving of the travelling clamp. Moreover, plural travelling clamps may be provided and driven by independent racks. The articulated rack below the drive means may reverse into secondary guide means parallel with the main guide means, or may be rolled or folded into a compact stowage space in the vicinity of the drive means.

The invention also provides a ram unit comprising an hydraulic cylinder closed at both ends, an axial piston and a radial piston, the axial piston being arranged to slide within the cylinder between first and second hydraulic chambers defined by the ends of the piston and of the cylinder, the radial piston projecting through an opening in the side of the cylinder at a point always between the two ends of the axial piston, the axial piston and radial piston having complementary inclined surfaces, keyed to one another, so as to push and pull the radial piston in response to hydraulic pressure in the respective chambers.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
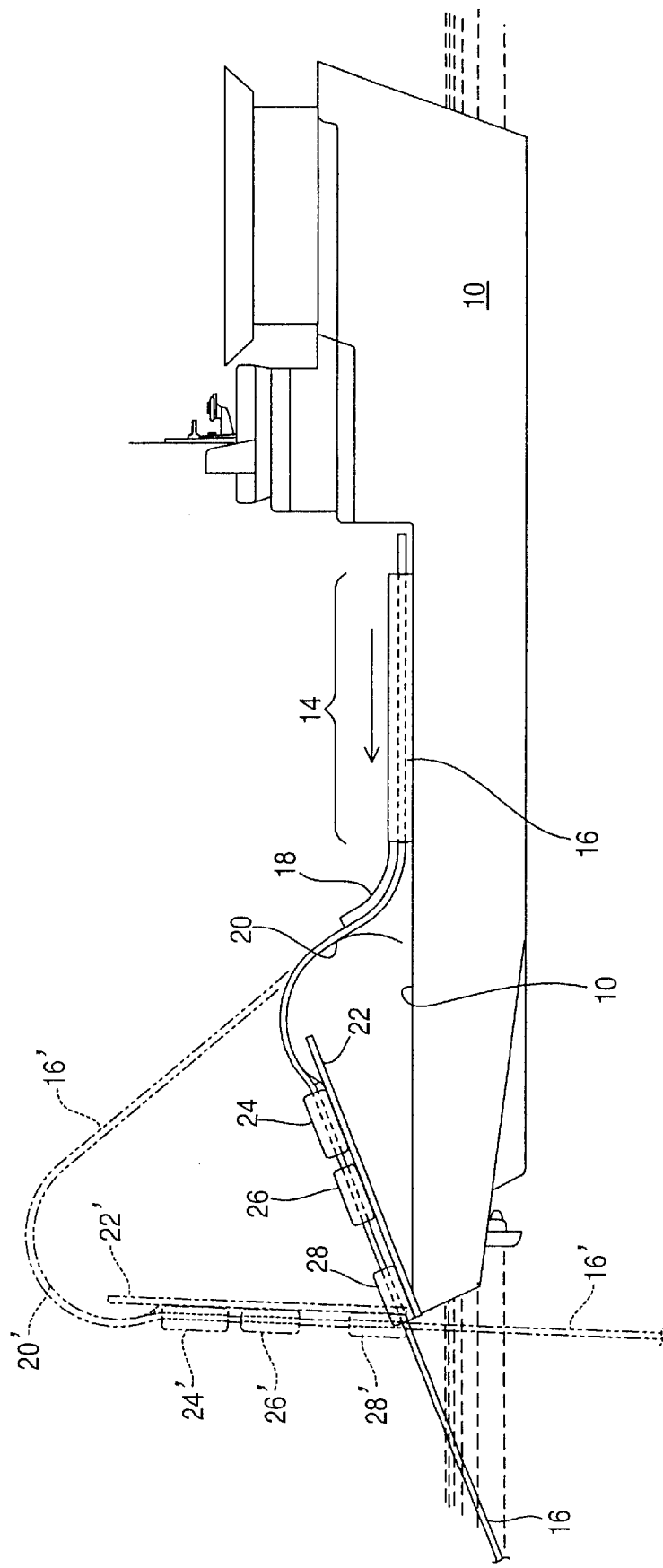
FIG. 1 illustrates a pipe laying vessel including a travelling clamp driven in accordance with an embodiment of the present invention.

FIG. 1 shows schematically the arrangement of a pipe laying vessel 10 having a deck 12, on which is mounted a pipe line assembly arrangement 14, comprising various welding, coating and testing stations for assembling a continuous pipeline from a stock of pipe segments. Pipe 16 formed in this way progresses in the direction of the arrow, over first and second radius controllers 18, 20. A tiltable ramp 22 is provided for launching the pipe over the stem of vessel 10. In solid lines, ramp 22 and other equipment are shown in a near-horizontal orientation, appropriate to lower water depths. In chain-dotted lines, the same components are shown in a steeply elevated orientation, with the reference signs primed (22' etc.). The radius controllers 18 to 20 guide the pipe and restrict within set limits, according to the angle of the ramp 22. On ramp 22 there are mounted various pipe handling devices, namely: straightener 24, tensioning and paying-out device 26 and fixed clamp 28.

The general arrangement is one described in more detail in U.S. Pat. No. 5,975,802, mentioned above. In the example described in U.S. Pat. No. 5,975,802, the paying out device 26 primarily takes the form of a track-type tensioner, capable of gripping the pipeline under many tonnes of tension, whilst paying it out in controlled fashion. The possibility of replacing the track tensioner with a moveable clamp is discussed therein, and the present invention discloses one form of apparatus and a method for doing this. Specifically, the present invention relates to a clamp 26 which comprises a novel clamp arrangement 26 carried on a trolley, supported and driven up and down the ramp 22 by means to be described in more detail below, with reference to FIG. 2. Whereas various clamping arrangements are known, for example, from WO-A-99/50582, however, these have drawbacks when placed under heavy load. In particular, known clamps are designed so as to tighten directly in response to axial load on the pipe. While this is superficially attractive property, the extreme loads present in deep pipelay operations can lead to undue clamping forces, and difficulty in releasing the clamp. Moreover, it has been shown that a J-lay or Reel-lay ship pitching in heavy weather can accelerate faster than the pipe, leading to reverse loading on the lock-off clamp. This "load reversal" has been known to dislodge clamps that employ slips or axially aligned wedges which have their blunt end uppermost.

Principle of the Clamps 26, 28

The clamps 26 and 28 are each comprised of sets of three shoes set at 120 degrees to each other with one shoe being positioned bottom dead centre. Each shoe may cover 100 degrees of the pipe surface and a length of 2 m. Each shoe is divided into a number of is attached to the base of a radial piston or piston member. The piston is extended by hydraulic actuating means which may be of conventional form and may for example be based on a wedge action as described in more detail below with reference to FIGS. 3 to 6. All the shoes are driven from a common hydraulic supply, ensuring an equal load is applied by each shoe to the article being gripped.

During normal payout the pipe is centred in the clamp by rollers (not shown) which protect the clamp pads from contacting the pipe surface and causing damage and unnecessary wear.

While the upper and lower clamps have the same principle of operation in this embodiment it is not necessary that they are of the same design. Specific considerations for their design in this example are shown below

Lower Clamp 28

Each shoe of the lower (fixed) clamp 28 is independently mounted on arms attached to the structure of the ramp 22. These arms (not shown) can be rotated to allow the shoes to retract below the level of the surface of the ramp 22 to allow the deployment of pipeline accessories. When the shoes are closed round a pipeline 16 the three segments are locked together by hydraulically activated lock boxes that ensure that the radial load is contained within the clamp shoe structure and not transmitted to the actuating arms. Each of the shoes has a pad for engaging the pipeline 16 and the pads at the lower end of the clamp 28 are extended to form a bell-mouth. This avoids line loads being applied to the pipe as the ship pitches.

Upper Clamp 26 & Trolley Drive

The upper clamp is a complete ring structure which does not open except for maintenance or pad replacement. This minimises the effective diameter of the clamp and reduces the clearance required between the work stations to allow the clamp to pass. The clamp is otherwise identical to the lower clamp, but without the bell-mouth. The clamp is rigidly fixed to a trolley which runs on rails on the inside surfaces of the ramp structure.

Figure 2A:
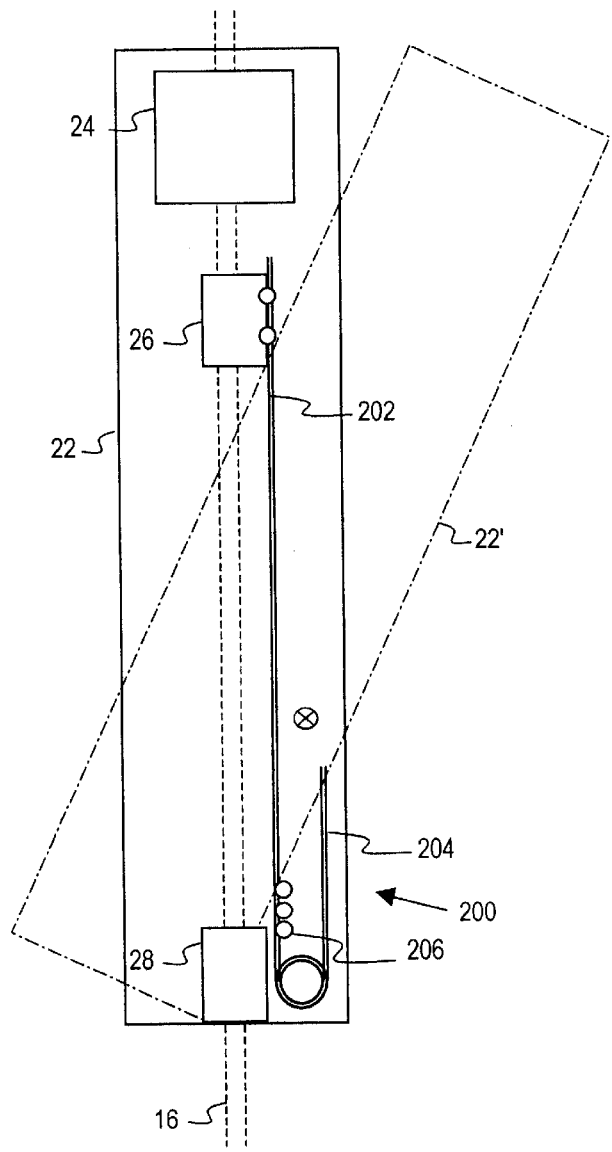
FIG. 2(a) shows schematically the arrangement of the articulated rack driving said traveling clamp in a raised position.
Figure 2B:
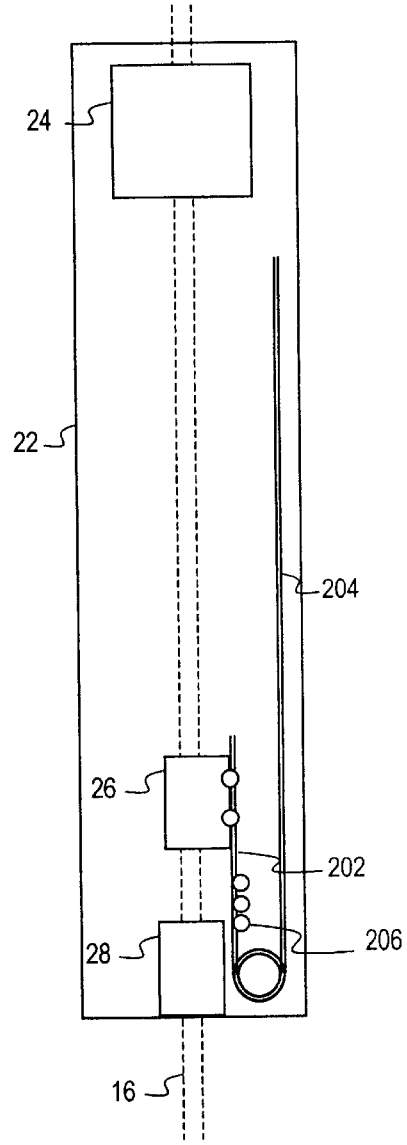
FIG. 2(b) shows schematically the arrangement of the articulated rack driving said traveling clamp in a lowered position.
Figure 2C:
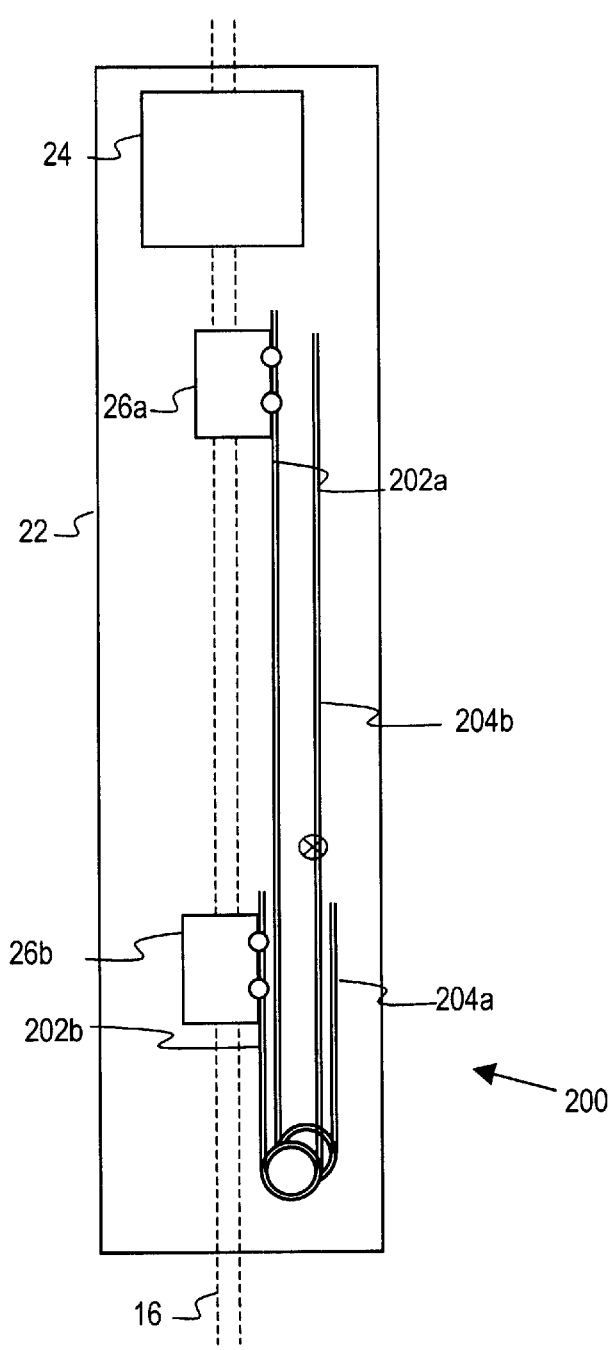
FIG. 2(c) shows schematically the arrangement of plural traveling clamps may be provided and driven by independent racks.

As shown schematically in FIG. 2, the trolley carrying clamp 26 is raised (a) and lowered (b) by a double rack and pinion drive system 200. Details of such a system as applied in a drilling rig derrick are given in WO-A-98/48142, mentioned above, the contents of which are hereby incorporated herein by reference. The skilled reader will readily appreciate any modifications necessary to apply the system in the context of a pipe laying tower or ramp.

Briefly described, at each side of the trolley guide a segmented and articulated rack 202 runs in a guide channel (not shown), which serves to prevent it buckling. The rack is thus incompressible longitudinally. At the lower end, the rack 202 articulates and reverses around a guide wheel into a second vertical channel, forming an unused rack section 204. In the present embodiment, each rack is powered by a set of frequency controlled electric motors 206. Brakes are provided so that the load can be held in the event of the failure of any one motor or gearbox per rack. The connection between the racks and the trolley is via load sensing pins, so that the load is continually monitored.

General Operation

In operation, the pipe 16 shown in dotted lines is clamped stationary by lower clamp 28. The travelling clamp 26 is opened. To raise the trolley into the position shown in FIG. 2(*a*), the motors 206 drive the rack sections 202 upwards, so that the unused sections 204 of the racks descend (shorten) while the sections 202 lengthen. The clamp 26 is closed to grip the pipe 16 and the lower clamp 28 is opened. The weight of the pipe suspended to the seabed is thus taken by the travelling clamp 26. The weight of the pipe is not transferred to the ramp 22 directly, however, in contrast to winch-based trolleys, or to track-type tensioner arrangements known in the prior art. In the present embodiment, the rack 202 in compression takes the load from the clamp 26 and passes it directly to the drive arrangement (motors and brakes 206) at the foot of the ramp 22.

As shown in broken lines at 22', the drive arrangement for the rack 202 is located around or even below deck level, and below the pivot axis X of the ramp 22. Thus the weight of the suspended pipe 16 is transferred to ramp 22 in the form of tensile loads, which are generally more favourable than compressive loads in such steel structures. Further advantages are achieved in this way, as (i) the mass of the drive arrangement itself need not contribute to a high centre of gravity of the vessel, and (ii) the structure of the ramp 22 need not be so heavily built in the absence of great vertical compressive load.

The electric motors 206 of the rack drive arrangements are then operated to lower the rack 202 and trolley so as to pay out the pipe 16 in a controlled fashion. Trolley eventually reaches the bottom of the ramp as shown in FIG. 2(*b*). At this point, most of the rack is in the unused section 204. The fixed, lower clamp 28 again grips the pipe 16 and the trolley is again raised to grip the pipe at the top of the ramp 22. In this way, the paying out process is repeated as often as necessary to lay a continuous pipe even in extreme depths of water.

For bending and straightening of the pipe 16 some back-tension is generally required, and this can be provided by the straightener 24 or other means. It may be necessary therefore for the travelling clamp 26 to exert a net pull downwards on the pipe 16, in addition to supporting a suspended weight of pipe by pulling upwards. The rack and drive means are designed accordingly, in a manner which is readily adapted from the disclosure of WO-A-99/48142, mentioned above and incorporated herein by reference.

As shown in FIG. 2(*c*), plural traveling clamps 26*a*, 26*b* may be provided and driven by independent racks 202*a*, 204*a* and 202*b*, 204*b*, respectively.

Piston Arrangement—Schematic

Figure 3:
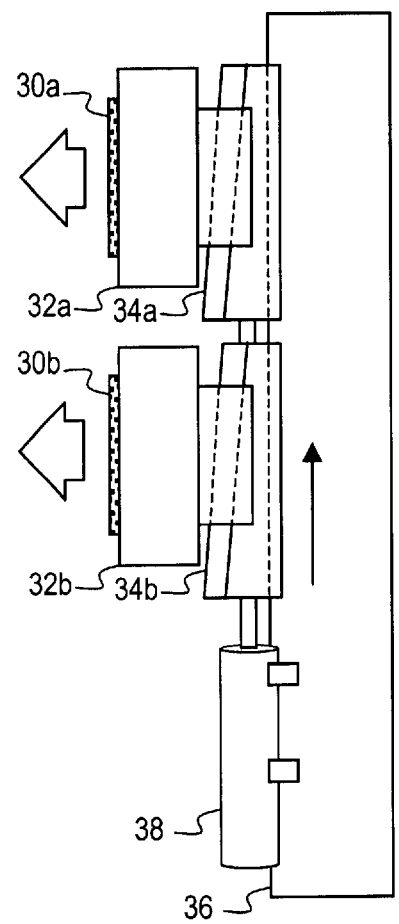
FIG. 3 is a schematic diagram of a wedge-based piston arrangement providing radial compression in the clamps of the apparatus

As shown schematically in FIG. 3, pads 30*a*, etc. of each clamp shoe are carried on respective pistons 32*a*, 32*b*. Two shoes only are shown, it being understood that the number of pads may be greater both along the length of the clamp and circumferentially (out of the plane of the diagram). Each piston 32*a*, 32*b* has a channel angled at around 15 degrees, which receives a matching-angled wedge member 34*a*, 34*b*. The wedge member is backed by a cylinder head 36 fixed on the frame of the apparatus. A hydraulic ram drives the wedges in the direction indicated by the simple arrow (vertical in FIG. 3).

By the action of ram 38 under hydraulic power, the clamp shoes are closed in the direction of the block arrows by inserting the 15-degree wedges 34*a* and 34*b* which slide between the cylinder head 36 (a fixed frame) and each piston 32*a*, 32*b*. The wedges are dovetailed in to the crown of the piston and are also constrained against the cylinder head by dovetailing or other retaining means (not shown) so that the shoe is positively retracted when the wedge is withdrawn. The wedges in each shoe are driven by a single hydraulic ram and all the rams are fed from a common supply ensuring that an equal load is applied by each shoe.

The direction and angle of the wedges is chosen so that in the event of a loss of hydraulic power to the wedges they do not slip out of engagement and release the clamp. In contrast to the clamp known from WO-A-99/50582, however, the axial tension in the pipe is not permitted to draw the wedges further into compression. Rather, by means of abutments on the supporting framework, not shown in FIG. 3, the clamp shoes are directly constrained against movement in the axial direction of the pipe. The engagement with the wedge then has to contend only with radial forces. This axial constraint will be seen in the more detailed example of FIGS. 4 to 6. Of course, in an alternative design, the axial force on the shoes might be permitted to draw the wedges further, at least in the event of power failure and the like. The abutments would then be absent, driven hydraulically for assisted release of the clamp, or made retractable.

Clamp—Detail

Figure 4:
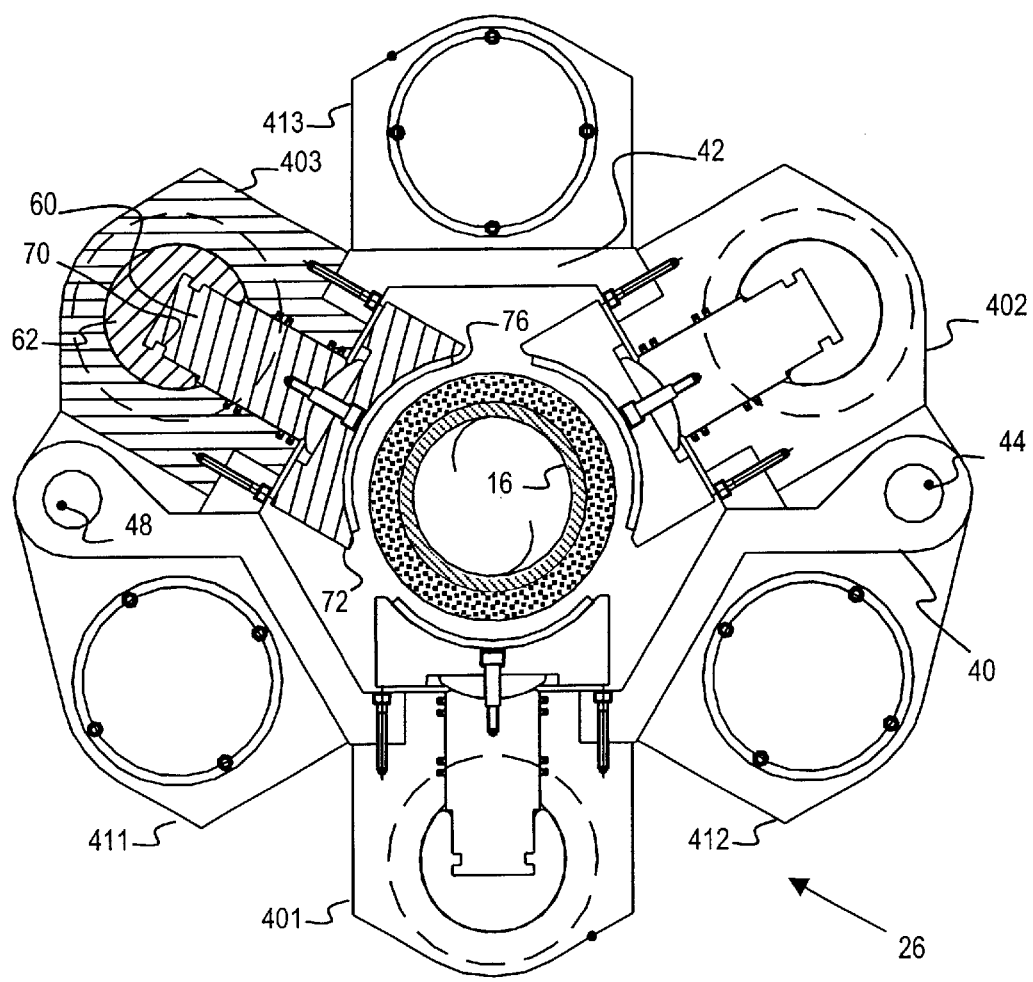
FIG. 4 shows the travelling clamp in a practical embodiment implementation of the apparatus in radial cross-section, (arrows IV–IV' in FIG. 5 indicate the section and viewing direction of FIG. 4)
Figure 5:
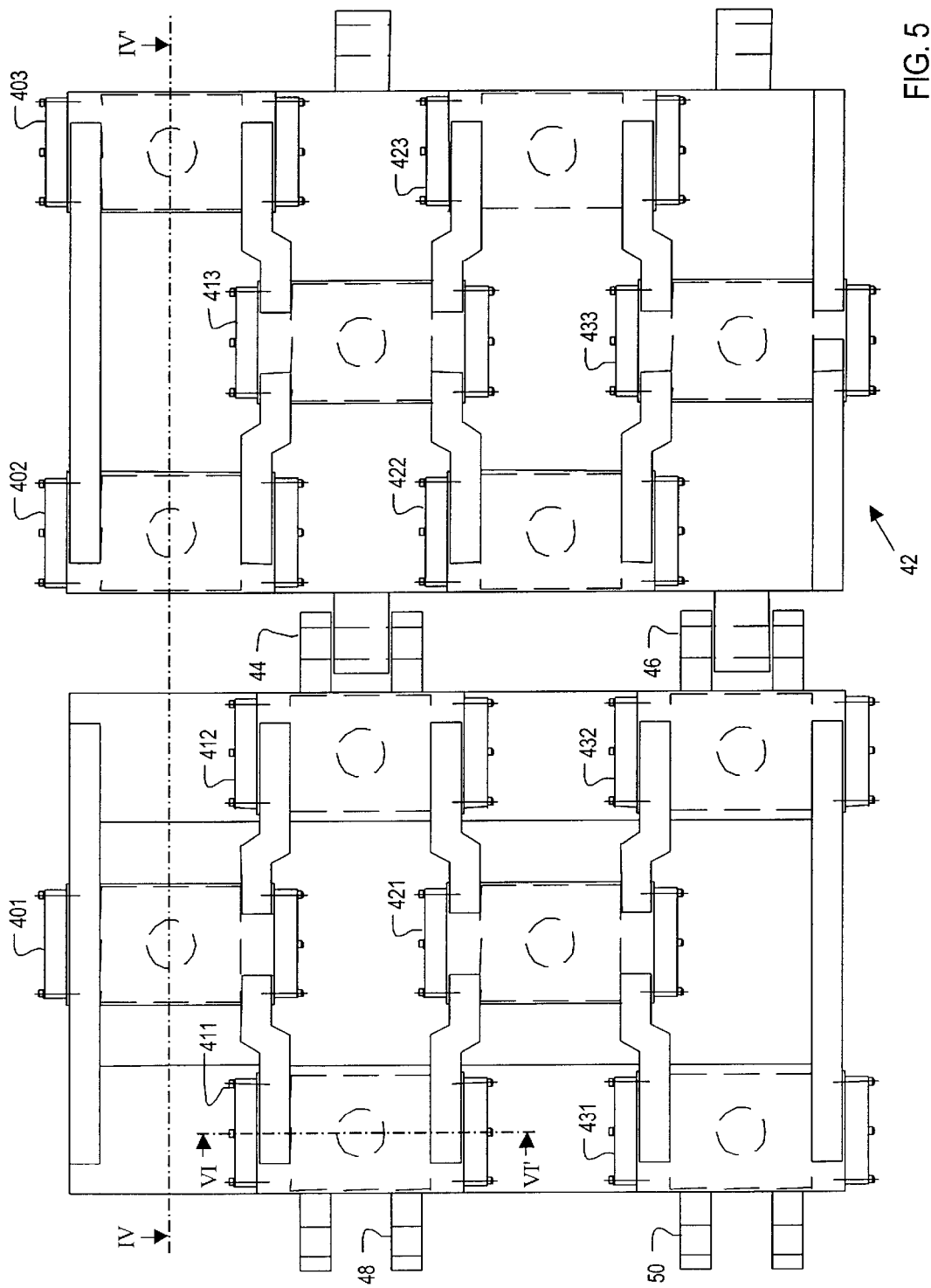
FIG. 5 shows the spatial arrangement of ram units in the opened-out configuration of the clamp.
Figure 6:
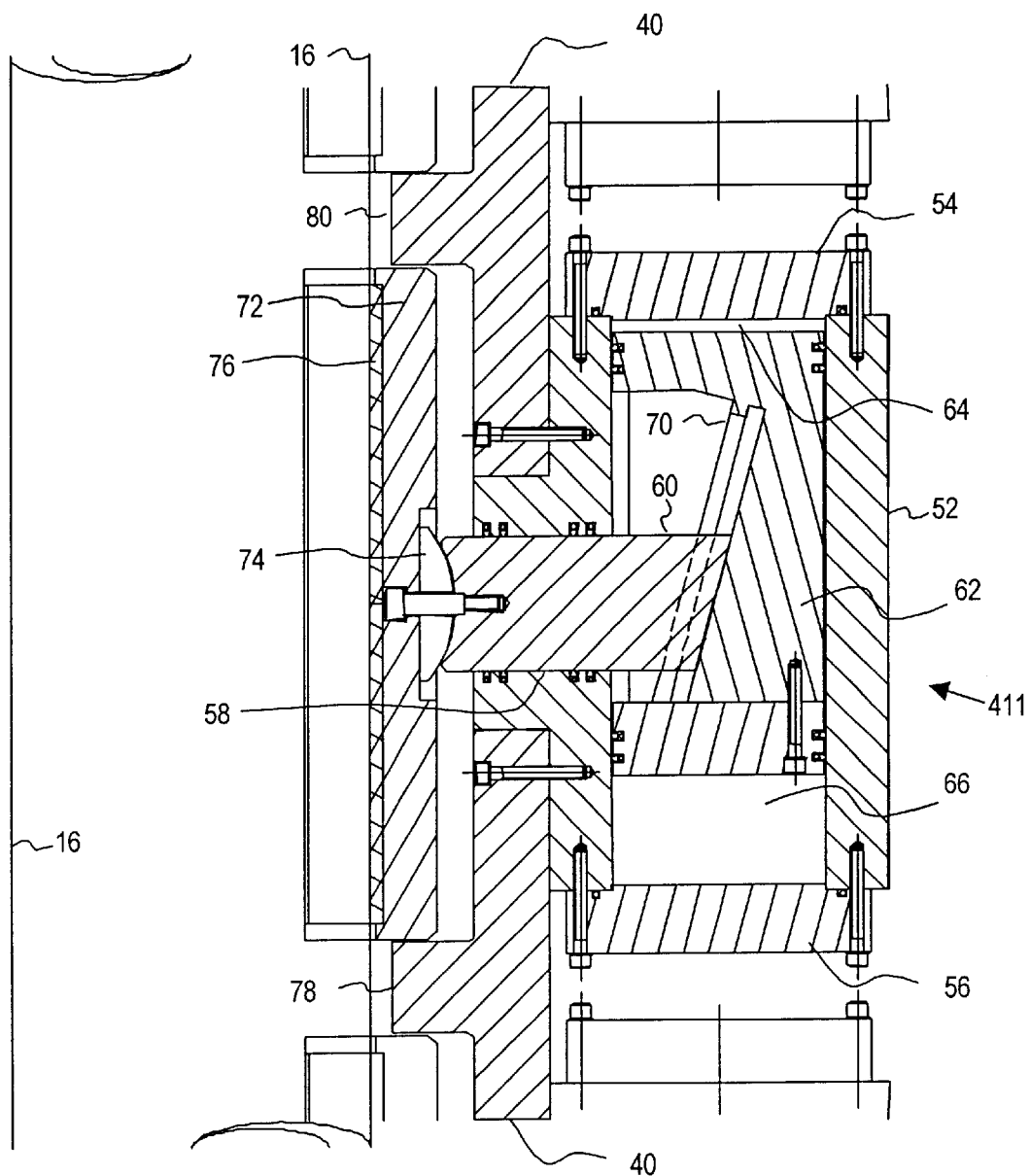
FIG. 6 is a vertical cross-section through one ram unit, along the line VI–VI' seen in FIG. 5.

FIGS. 4 to 6 of the drawings show a preferred embodiment of the upper clamp 26. FIG. 4 shows the clamp 26 in a radial cross-section, (arrows IV–IV' in FIG. 5 indicate the section and viewing direction of FIG. 4). FIG. 5 shows the spatial arrangement of ram units in the opened-out configuration of the clamp. FIG. 6 is a vertical cross-section through one ram unit, along the line VI–VI' seen in FIG. 5.

As seen best in FIG. 4, clamp 26 in use forms a complete ring structure surrounding the pipe 16 or other workpiece. The clamp 26 comprises two half shells 40, 42 that are pivotally mounted to one another by hinges 44, 46. For operational use the two half shells are locked together by pins which pass through holes 48, 50 at the opposite side of the shell from the hinges. Referring for clarity also to FIG. 5, it will be seen that twelve ram units are arranged in four sets of three: 401–403, 411–413, 421–423 and 431–433. Within each set, the three rams impinge radially upon the workpiece at 120 degree separation. The angular positions in each set are offset from the set(s) above or below, so that the ram units act radially from six directions in all.

FIG. 6 is a detailed axial section through a representative ram unit such as unit 411. Each ram unit comprises a hollow cylindrical body 52 closed off at each end with end caps 54, 56. The cylindrical body 52 has a side opening 58, in which a push rod or radial piston 60 is located so that it extends into the bore of cylindrical body 52. An axial piston 62 is located within body 52 and engages the inner walls of the cylindrical body 52. Axial piston 62 is movable under hydraulic pressure in upper and lower spaces 64, 66. Each piston is provided with piston rings to seal it where it slides within cylindrical body 52. Like numbered parts are labelled in the radial cross-section of ram unit 403, in FIG. 4.

Axial piston 62 is a substantially solid member comprising two parts in this example and has a recess 68 cut into one side thereof. The base of the recess is and inclined surface defining a wedge angle of 15 degrees. A key rail 70 runs parallel to the base of the recess. Radial piston 60 is a cylindrical member having an inclined surface at one end and a concave recess at the other. The inclined surface of radial piston 60 is provided with a key slot which positively engages rail 70 in the axial piston 62. Thus, as axial piston 62 moves within the cylinder 52, radial piston 60 is extended and positively retracted, depending on the pressure of fluid in the chambers 64 and 66.

A clamping shoe 72 is mounted on the outer end of the radial piston 60 by a self-aligning joint 74, permitting some pivoting of the shoe relative to the axis of the radial piston. In this example the joint self aligning unit comprises a part-spherical bearing surface which engages the concave surface in the end of the radial piston. A friction tile 76 is mounted on the shoe so as to enhance the grip of the shoe on the workpiece 16, and also protect the latter against damage. The shoe and friction tiles are shaped to conform with the outer cylindrical surface of the workpiece. As seen more clearly in FIG. 4, workpiece 16 in practice may comprise a steel pipe with a polymer coating, susceptible to crushing if handled wrongly.

Importantly, shell half 40 incorporates a series of shoulders 78, 80 so that shoe 72 constrained between the shoulders to prevent excessive axial movement of the shoe. By this means, the axial load in the workpiece is transferred from the shoe to the framework of the clamp 26, rather than to the radial piston 60 and its bearings.

Summarising the benefits of the novel clamp design, these are:

High clamping loads can be applied by the action of the wedge in the inclined plane;

Axial load is not taken by the piston member, thereby increasing the working life thereof;

Positive engagement and release of the friction tile is achieved;

Minor changes in diameter of the elongate article are taken by each tile being moveable and compliant;

The friction tiles can be changed to accommodate changes in the diameter or structure of the article to be laid and these are small enough to be easily manhandled and installed;

The piston member may be rotated for operation at the desired angle to suit the particular circumstances. The clamp can be actuated by any suitable means. Use of the friction tiles increases and maximises the engaging surface circumferentially and therefore the application of the load to the workpiece.

As mentioned in the introductory portion of this specification, the same piston arrangement can be applied in radial compression for other purposes, such as in radial friction welding. For further detail of the radial friction welding process, reference is made to WO-A-97/32686, mentioned above. The compact ram arrangements can be used independently of a radial clamp, for example as jacking or pressing devices.

The above embodiments and other variations, modifications and further applications of the invention in its various aspects will be apparent to the skilled reader, from consideration of the present disclosure. The embodiments described herein are presented by way of example only, and are not intended to limit the scope of protection in any way.

What is claimed is:

1. A pipe handling apparatus for handling a pipe, the pipe extending along an axis within the apparatus when in use, said apparatus comprising:
    an elongate structure;
    an articulated rack;
    a traveling clamp;
    drive means for elevating and lowering said clamp under load; and
    a main guide means for guiding the traveling clamp and rack for movement substantially parallel to said axis within said elongate structure;
    wherein said drive means are arranged to act at a lower portion of said rack, the traveling clamp being connected to the rack to be driven along said main guide means by movement of said rack in the main guide means.

2. The pipe handling apparatus as claimed in claim 1, wherein said elongate structure is tiltable about a pivot point.

3. The pipe handling apparatus as claimed in claim 2, adapted for use on a vessel for laying pipes wherein said pivot point is substantially at deck level of said vessel, and the remainder of the structure is tiltable about said pivot point above deck level.

4. The pipe handling apparatus as claimed in claim 2, wherein said drive means is located within said structure below said pivot point.

5. The pipe handling apparatus as claimed in claim 4, wherein the articulated rack is situated below the drive means and acts as a secondary guide means to the main guide means.

6. The pipe handling apparatus as claimed in claim 1, wherein a number of racks are applied for balanced driving of the traveling clamp.

7. The pipe handling apparatus as claimed in claim 6, wherein the articulated rack is situated bellow the drive means and acts as a secondary guide means to the main guide means.

8. The pipe handling apparatus as claimed in claim 1, wherein a number of traveling clamps are each driven by an independent rack or racks.

9. The pipe handling apparatus as claimed in claim 8, wherein the articulated rack is situated below the drive means and acts as a secondary guide means to the main guide means.

10. The pipe handling apparatus as claimed in claim 1, wherein said traveling clamp comprises an array of ram units arranged to act radially on the pipe and mounted within a supporting structure, which supporting structure is arranged to surround the pipe, wherein each ram unit includes a piston member constrained to move in a direction towards and away from the pipe and a wedge member driven transverse to the direction of the movement of the piston member so as to act between the piston member and said supporting structure to effect said movement.

11. The pipe handling apparatus as claimed in claim 10, wherein the wedge member is keyed to said piston member so as to effect forcible movement of the piston member toward and away from the pipe.

12. The pipe handling apparatus as claimed in claim 11, wherein the wedge member is keyed to the piston member by a dovetail channel and rail arrangement.

13. The pipe handling apparatus as claimed in claim 10, wherein the wedge member is connected to hydraulic drive means.

14. The pipe handling apparatus as claimed in claim 13, wherein a plurality of wedge members are grouped by hydraulic linkage, to equalize actuating forces around the circumference of an object under pressure.

15. The pipe handling apparatus as claimed in claim 10, wherein the wedge member is constrained against movement in a direction parallel to the axis of the pipe.

16. The pipe handling apparatus as claimed in claim 15, wherein the wedge member is keyed to the supporting structure.

* * * * *